J. U. KORÉE AND A. M. MALLUK.
VEHICLE WHEEL.
APPLICATION FILED JUNE 7, 1922.
1,428,243.
Patented Sept. 5, 1922.
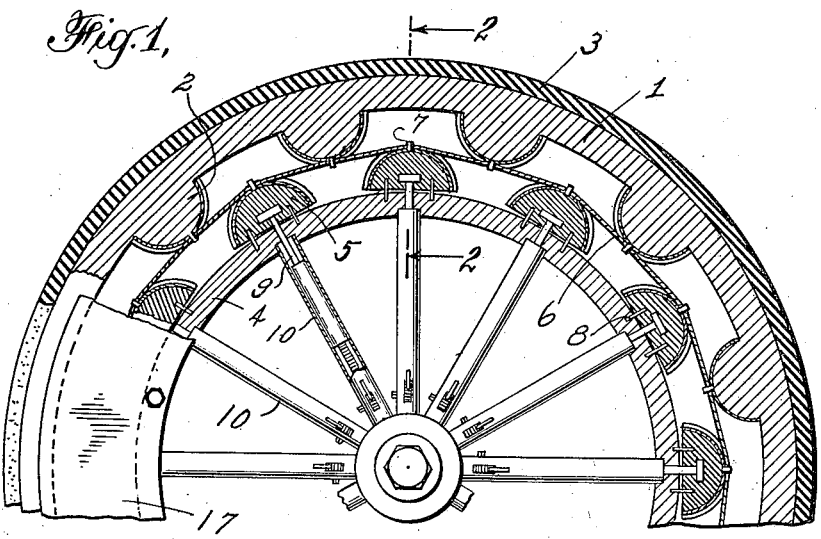
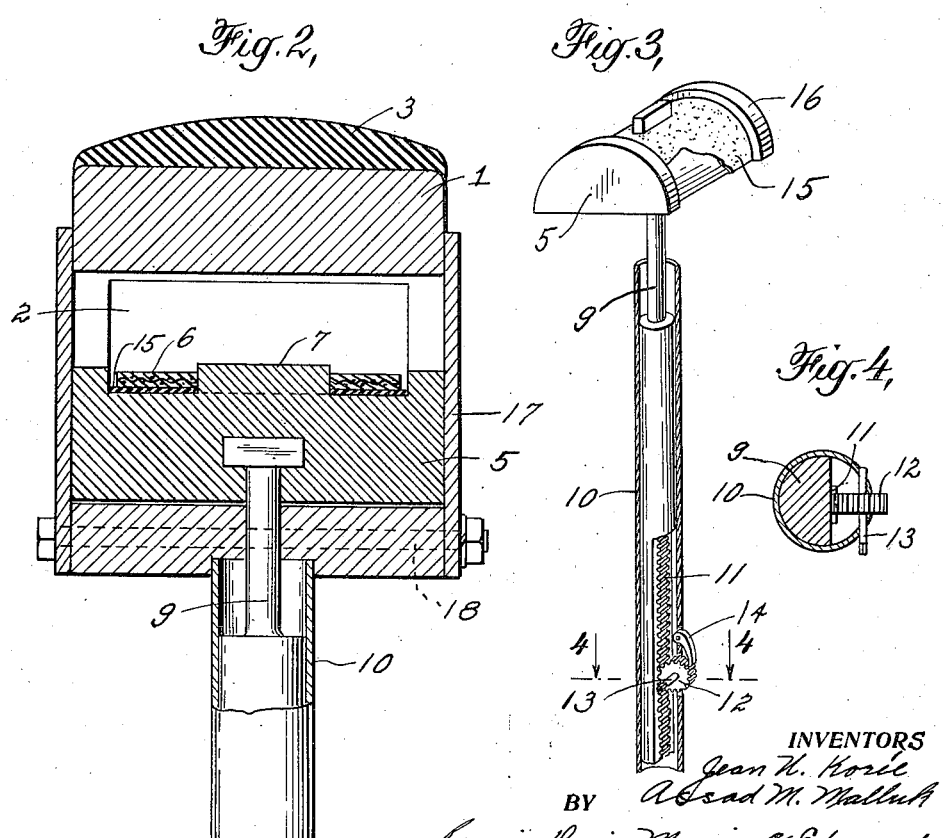
INVENTORS
Jean U. Korée
Assad M. Malluk
BY
Pennie Davis Marvin & Edmonds
ATTORNEY Patented Sept. 5, 1922.

1,428,243

UNITED STATES PATENT OFFICE.

JEAN U. KORÉE AND ASSAD M. MALLUK, OF NEW YORK, N. Y., ASSIGNORS TO INTERNATIONAL PATENT INVESTMENT CORPORATION, OF NEW YORK, N. Y., A CORPORATION OF DELAWARE.

VEHICLE WHEEL.

Application filed June 7, 1922. Serial No. 566,512.

*To all whom it may concern:*

Be it known that we JEAN U. KORÉE, a subject of the King of Rumania, residing at and whose post-office address is No. 1834 Broadway, in the city, county, and State of New York, and ASSAD M. MALLUK, a citizen of France, residing at and whose post-office address is No. 170 West 72d Street, in the city, county, and State of New York, have invented certain new and useful Improvements in Vehicle Wheels; and we do hereby declare the following to be a full, clear, and exact description of the invention, such as will enable others skilled in the art to which it appertains to make and use the same.

This invention relates to improvements in vehicle wheels, the principal object being to provide a vehicle wheel having a resilient tire, the resilient character of the tire being due to an improved combination of mechanical parts, rather than to a pneumatic tube.

The improved vehicle wheel comprises a rigid outer rim which may be covered by a band of hard rubber, or other resilient material. This rigid outer rim is supported by a band of substantially inextensible material. This band, in turn, is supported by an inner rim. The inner rim is also rigid and carries a plurality of members or projections extending outwardly therefrom and contacting with the band. The outer rim also contacts with the band through a plurality of inwardly extending projections spaced apart at equal intervals, and located between the projections on the inner rim.

An improved means is provided for adjusting the tension of the band. Hollow spokes are used which contain the means for adjusting the tension of the band above referred to.

One object of the invention is to provide resilient tires of simple construction. By the provision of a rigid outer rim, supported as described above, this object may be attained.

It will be noted that one advantage of this invention lies in the fact that the shocks received by the wheel are distributed around the circumference of the wheel by virtue of the rigid outer rim, instead of being absorbed locally as is the case with the ordinary pneumatic tire, or other tire having a flexible resilient outer rim.

The above advantage and numerous others will be apparent from the following description which is to be taken in conjunction with the accompanying drawings.

In the drawings:

Fig. 1 is a partial vertical section of our improved vehicle wheel;

Fig. 2 is a transverse section taken on line 2—2 of Fig. 1;

Fig. 3 is a perspective view, partially in section, of one of the outwardly extending members provided on the inner rim, showing the details of construction, and the method of adjusting the tension of the band; and Fig. 4 is a transverse section taken on line 4—4 of Fig. 3.

By referring to the drawings it will be noted that the improved wheel comprises an outer rigid rim 1, carrying a plurality of inwardly extending projections 2, preferably integral therewith. A hard rubber band 3 may be provided on the outside of the outer rim 1 for the purpose of preventing vibration and noise. The projections 2 are substantially semi-circular in cross section, and have a length substantially equal to the width of the outer rim 3.

An inner rigid rim 4 is provided, this rim carrying a plurality of outwardly extending projections 5, these projections 5 being loosely mounted thereon. A band 6 is provided, this band being made of material which is substantially inextensible. For example, this band may be made of cotton covered wire, the wire being vulcanized to form a continuous band. This band 6 is secured to the projections 5 and 2 by means of suitable pins 7, or other equivalent means.

Each of the projections 5 is provided with a pin 8 loosely associated therewith for the purpose of guiding the projections 5, and holding them in their proper positions. A rod 9 is connected to each of the projections 5, the rod extending through the inner rim 4 and into the corresponding hollow spoke 10. The rod 9 is free to move in a radial direction in order to adjust the tension of the band 6.

As shown more particularly in Figs. 3 and 4, the inner portion of each of the rods 9 is provided with a flat surface carrying rack teeth 11. A small pinion 12 engaging the teeth 11 is mounted on the spoke 10, this pinion being adapted to be turned by means of a key (not shown) engaging the shaft 13. A pawl 14 is provided for the purpose of holding the pin 12 in its adjusted position. A sleeve 15 is provided on each of the projections 2 and 5, this sleeve being made of rubber, fibre, or other suitable material, which is adapted to engage the band 6 and prevents this band from wearing through at the points where it comes in contact with the projections 2 and 5. A collar 16 is provided at each end of the projections 2 and 5, the purpose of this collar being to keep the band 6 in proper alignment.

A circular plate 17 may be provided on each side of the tire, these plates being held in place by any suitable means, as by the bolts 18 passing through the inner rim 4.

From the above description it will be apparent that this invention provides a very simple vehicle wheel which is adapted to absorb all shocks to which it is subjected, the shocks being absorbed by being distributed around the periphery of the wheel. The outer rigid rim 1 transmits the shocks to the band 6 which absorbs them completely.

It is to be understood that the size and proportions of the various parts may be varied without departing from the principle of the invention which is not limited to the particular embodiment shown and described, but is intended to include such modifications thereof as fall within the scope of the appended claims.

We claim:

1. A vehicle wheel comprising an outer rim, a plurality of projections extending inwardly therefrom, an inner rim, a plurality of projections extending outwardly therefrom between said first named projections, a band of substantially inextensible material interposed between said inwardly and outwardly extending projections and means for adjusting certain of said projections to vary the tension of said band.

2. A vehicle wheel comprising a rigid outer rim, a plurality of inwardly extending projections integral with said rim, said projections being substantially semi-circular in cross section, and of a length substantially equal to the width of the rim, a rigid inner rim, a plurality of projections loosely mounted thereon and extending outwardly therefrom between said first named projections, a band of substantially inextensible material interposed between said inwardly and outwardly extending projections and means for adjusting certain of said projections to vary the tension of said band.

3. A vehicle wheel comprising a rigid outer rim, a plurality of inwardly extending projections integral with said rim, each of said projections being substantially semi-circular in cross section, and of a length substantially equal to the width of said outer rim and having a collar at each end thereof, a rigid inner rim, a plurality of projections loosely mounted thereon and extending outwardly therefrom between said first named projections, a band of substantially inextensible material interposed between said inwardly and outwardly extending projections and means for adjusting the projections on said inner rim to vary the tension of said band.

4. A vehicle wheel comprising a rigid outer rim, a plurality of inwardly extending projections integral with said rim, each of said projections being substantially semi-circular in cross section, and of a length substantially equal to the width of said outer rim and having a collar on each end thereof, a rigid inner rim, a plurality of projections loosely mounted thereon and extending outwardly therefrom between said first named projections, a band of substantially inextensible material interposed between said inwardly and outwardly extending projections, a band of resilient material covering each of said inwardly extending projections and means for adjusting certain of said projections to vary the tension of said band.

5. A vehicle wheel comprising a rigid outer rim, a plurality of projections extending inwardly therefrom, a rigid inner rim, a plurality of projections extending outwardly therefrom between said first named projections, each of said outwardly extending projections being loosely mounted on said inner rim, and having a substantially semi-circular cross section and a length substantially equal to the width of said inner rim and having a collar on each end thereof, a band of substantially inextensible material interposed between said inwardly and outwardly extending projections, means for holding said outwardly extending projections in position, and means for moving said outwardly extending projections radially to adjust the tension of said band.

6. A vehicle wheel comprising a rigid outer rim, a plurality of projections extending inwardly therefrom, a rigid inner rim, a plurality of projections extending outwardly therefrom between said first named projections, each of said outwardly extending projections being loosely mounted on said inner rim, and having a substantially semi-circular cross section and a length substantially equal to the width of said inner rim and having a collar on each end thereof, a band of substantially inextensible material interposed between said inwardly and outwardly extending projections, means for holding said outwardly extending projections in position, and means for moving said outwardly extending projections radially to adjust the tension of said band, comprising a rod secured to each of said projections and extending inwardly inside the corresponding spoke of said wheel, and means for adjusting the position of said rod.

7. A vehicle wheel comprising a rigid outer rim, a plurality of projections extending inwardly therefrom, a rigid inner rim, a plurality of projections extending outwardly therefrom between said first named projections, each of said outwardly extending projections being loosely mounted on said inner rim, and having a substantially semi-circular cross section and a length substantially equal to the width of said inner rim and having a collar on each end thereof, a band of substantially inextensible material interposed between said inwardly and outwardly extending projections, means for holding said outwardly extending projections in position, and means for moving said outwardly extending projections radially to adjust the tension of said band, comprising a rod secured to each of said projections and extending inwardly inside the corresponding spoke of said wheel, said rod having rack teeth thereon adapted to be engaged by a pinion mounted on said spoke.

8. In a vehicle wheel of the character described, means for adjusting the tension of the resilient band, comprising a rod, a hollow spoke enclosing said rod, rack teeth on said rod, a pinion engaging said rack teeth, said pinion being mounted on said hollow spoke and adapted to be turned to adjust said rod radially and means for holding the said pinion in its adjusted position.

9. In a vehicle wheel of the character described, means for adjusting the tension of the resilient band, comprising a rod, a hollow spoke enclosing said rod, and adjustable means for varying the position of said rod within said spoke.

10. In a vehicle wheel of the character described, means for adjusting the tension of the resilient band, comprising a member in contact with said band, a rod mounted in said member, a hollow spoke enclosing said rod, and adjustable means for varying the position of said rod within said spoke.

In testimony whereof we affix our signatures.

JEAN U. KORÉE.
ASSAD M. MALLUK.